(12) United States Patent
Noe

(10) Patent No.: US 6,842,614 B2
(45) Date of Patent: Jan. 11, 2005

(54) NETWORK ANALYZER FOR MEASURING THE ANTENNA RETURN LOSS IN A LIVE CELLULAR NETWORK

(75) Inventor: Terrence R. Noe, Sebastopol, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 551 days.

(21) Appl. No.: 10/067,659

(22) Filed: Feb. 4, 2002

(65) Prior Publication Data

US 2003/0148762 A1 Aug. 7, 2003

(51) Int. Cl.[7] .................................................. H04G 7/20
(52) U.S. Cl. ................. 455/423; 455/115.1; 455/226.1; 455/67.11
(58) Field of Search ............................... 455/423–425, 455/522, 67.11, 67.14, 67.16, 69, 70, 101, 103, 115.1–115.4, 132–134, 226.1–226.4, 236.1–237.1, 277.1

(56) References Cited

U.S. PATENT DOCUMENTS 4,758,775 A * 7/1988 Roos .......................... 324/642
5,003,253 A * 3/1991 Majidi-Ahy et al. ........ 324/754
6,329,805 B1 * 12/2001 Bracht et al. ............ 324/76.12

* cited by examiner

Primary Examiner—Duc Nguyen (57) ABSTRACT

A network analyzer is capable of measuring the antenna return loss in a live cellular network. The network analyzer receives and analyzes the base station transmitted signal to determine which transmit frequencies are active. Based on information relating to the correlation between the transmit frequency and the associated receive frequency, the network analyzer determines the active receive frequencies. An unmodulated source that avoids inclusion of the active receive frequencies is generated by the network analyzer. To fill in the antenna sweep with the previously avoided frequencies, the network analyzer generates another source containing only those avoided frequencies when no calls are active on the avoided frequencies. Alternatively, the antenna return loss on the avoided frequencies is interpolated from the measured frequencies. As a further alternative, the network analyzer receiver determines a nearby frequency to an active frequency, and adaptively measures the nearby frequency as the avoided (active) frequency.

19 Claims, 6 Drawing Sheets

NETWORK ANALYZER FOR MEASURING THE ANTENNA RETURN LOSS IN A LIVE CELLULAR NETWORK

BACKGROUND OF THE INVENTION

1. Technical Field of the Invention

The present invention relates generally to test and measurement systems, and in particular, to network analyzers for measuring the antenna return loss of cellular base station antennas.

2. Description of Related Art

Network analyzers measure the antenna return loss of a cellular base station antenna by injecting a swept signal covering the antenna transmit and/or receive frequencies into the device under test (DUT), i.e., antenna, and measuring the magnitude and phase of the signal that is reflected back. For example, typically, a technician connects the network analyzer to the feeder cable extending between the antenna and the base station, and injects a signal into the feeder cable. If there are any discontinuities in the feeder cable or antenna, part of the signal may be reflected back down the feeder cable to the network analyzer.

Network analyzers are primarily utilized when the antenna being tested is not currently in use. However, if a "live" (i.e., currently in-use) test is required, the injected signal has the potential to disrupt the existing radio links between the base station and customers' mobile phones. For example, when testing a receive antenna (i.e., an antenna operating at the base station receive frequencies), as the network analyzer's source sweeps through the channel that the mobile phone's transmitter occupies (i.e., up-link channel from the mobile phone to the base station), a high level of interference is experienced at the input to the base station receiver. The interference could result in a reduction of the call quality, and possibly cause the call to drop.

One known way to avoid the interference that results from introducing a swept signal onto a "live" antenna is to use the base station transmitter as the source stimulus. Instead of injecting a swept signal into the DUT, a device, such as a Voltage Standing Wave Ratio (VSWR) monitor, can be connected to the feeder cable extending from the base station transmitter to the antenna to measure the actual transmitted signal (i.e., the signals that are transmitted on the down-link frequencies from the base station transmitter to the customer's mobile phones), and the amount of the transmitted signal that is reflected back from the antenna. Since there are no extraneous signals injected onto the antenna, the potential for interference is eliminated.

However, most base station receivers are connected to different physical antennas than base station transmitters. Therefore, by using the base station transmitter as the source, in many cases, only the transmit antennas can be tested. The receive antennas would have to be tested using a swept signal, which produces interference, as discussed above.

Additionally, most antenna customers want to know the antenna return loss over the entire transmit frequency band to make an informed decision about the status of the antenna (e.g., return loss degradations at only some of the frequencies may indicate a slowly degrading antenna that is destined to fail and should be replaced). However, by using the base station transmitter as the source, transmitted and reflected signal measurements can only be made on the frequencies at which the base station is actually transmitting. Furthermore, without a broadband return loss measurement, the time-domain impulse response of the transmit antenna cannot be accurately calculated. The time-domain impulse response is used by time-domain reflectometry (TDR) to locate the physical position of breaks in the antenna cable. To be effective, TDR requires a broad frequency sweep.

Another known technique for avoiding interference that results from introducing a signal onto a "live" antenna is to modulate the network analyzer's source to generate a spread-spectrum signal. For example, both frequency chirps and direct-sequence spread spectrum modulation methods have been used. In order to guarantee that the power spectral density of the source falls below that of the received mobile signal, wide spreading of the source is required. As a result of the source frequencies being spread, the frequency resolution of the resulting measurement is degraded. In addition, direct sequence spread spectrum modulation has the additional disadvantage of being relatively expensive to implement. What is needed is a technique for measuring antenna return loss of cellular base station antennas without disrupting the existing traffic on the network.

SUMMARY OF THE INVENTION

The present invention provides a network analyzer capable of measuring the antenna return loss in a live cellular network. The network analyzer receives and analyzes the base station transmitted signal to determine which transmit frequencies are active. Based on information relating to the correlation between the transmit frequency and the associated receive frequency, the network analyzer determines the active receive frequencies. An unmodulated source that avoids inclusion of the active receive frequencies is generated by the network analyzer.

In some embodiments, to fill in the antenna sweep with the previously avoided frequencies, the network analyzer generates a source containing only those avoided frequencies when no calls are active on the avoided frequencies. In other embodiments, the antenna return loss on the avoided frequencies is interpolated from the measured frequencies. In further embodiments, the network analyzer receiver determines a nearby frequency to an active frequency, and adaptively measures the nearby frequency as the avoided (active) frequency.

Advantageously, using an unmodulated source provides high frequency-domain resolution at a relatively low cost. In addition, since the source is swept over a broad frequency band, the TDR performance resulting from the return loss measurement provided by the network analyzer of the present invention is improved relative to that of a VSWR monitor. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
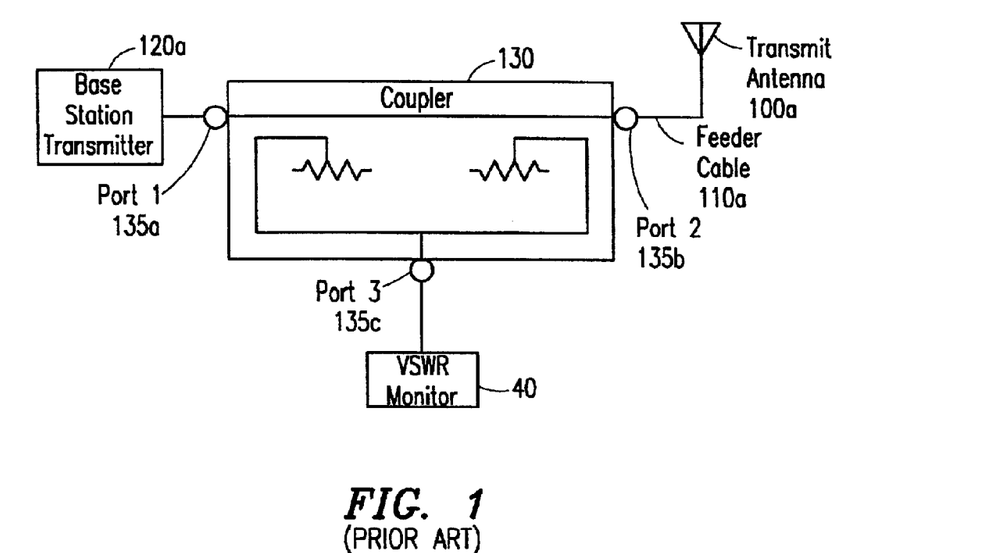
FIG. 1 illustrates a conventional network VSWR monitor connected between a base station transmitter and a transmit antenna that uses the base station transmitter as the source stimulus for measuring the antenna return loss on a transmit antenna.

FIG. 1 illustrates a conventional VSWR 40 connected between a base station transmitter 120a and a transmit antenna 100a that uses the base station transmitter 120a as the source stimulus for measuring the antenna return loss on a transmit antenna 100a. The VSWR monitor 40 is shown connected to a coupler 130 that is placed on a feeder cable 110a between the base station transmitter 120a and the transmit antenna 100a. The coupler 130 has three ports 135a–c, in which the first port 135a receives the base station transmissions from the base station transmitter 120a, the second port 135b transmits the base station transmissions towards the transmit antenna 100a and receives reflected signals produced by discontinuities in the feeder cable 110a or transmit antenna 100a and the third port 135c couples the base station transmissions and reflected signals to the VSWR monitor 40 to measure the antenna return loss. Since the base station transmit power level is high (as compared to receive power levels), any attenuation in the base station transmissions caused by the coupler 130 is negligible.

Figure 2:
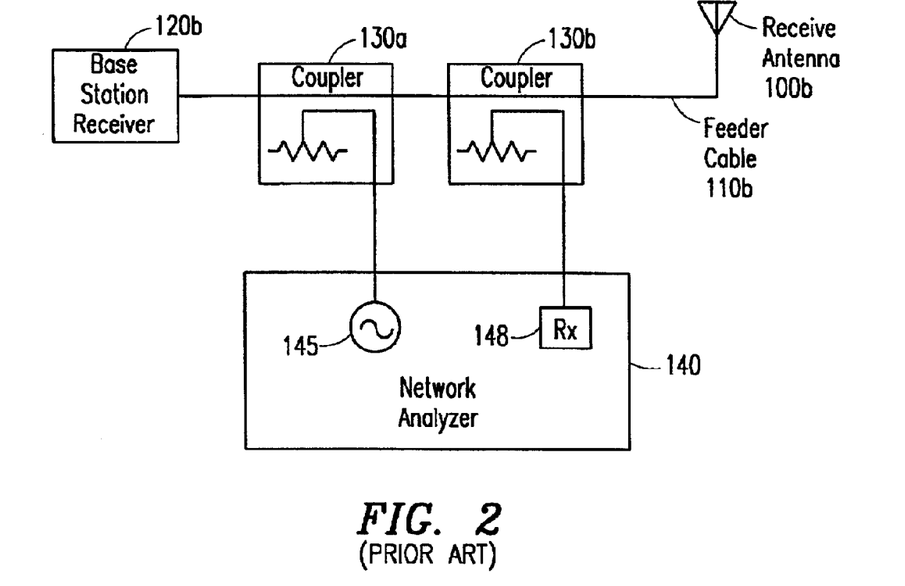
FIG. 2 illustrates a conventional network analyzer connected between a base station receiver and receive antenna that injects a swept signal into the receive antenna to measure the antenna return loss on the receive antenna.

However, as discussed above, coupling a VSWR monitor 40 to the transmit antenna 100a does not provide a complete transmit frequency antenna return loss analysis, nor does it provide any receive frequency antenna return loss analysis. Therefore, as shown in FIG. 2, a conventional network analyzers 140 can be connected between a base station receiver 120b and a receive antenna 100b to inject a swept signal into the receive antenna 100b to measure the antenna return loss on the receive antenna 100b. A source 145 generates a swept signal and introduces the swept signal onto the feeder cable 110b connecting the base station receiver 120b and the receive antenna 100b through the use of a first coupler 130a. The swept signal propagates towards the receive antenna 100b through a second coupler 130b.

Any discontinuities in the feeder cable 110b or receive antenna 100b cause a reflected signal to be sent back towards the second coupler 130b. The second coupler 130b couples the reflected signal to a receiver 148 within the network analyzer 140 to perform an antenna return loss measurement.

Figure 3:
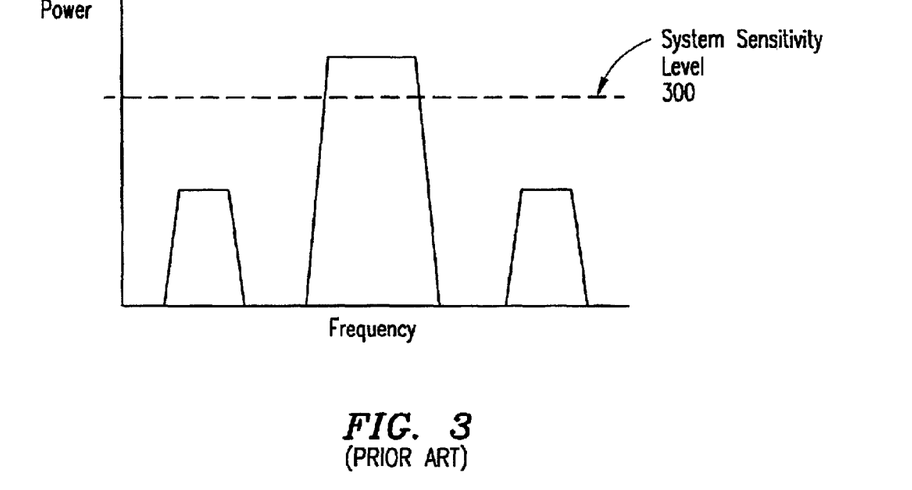
FIG. 3 is a chart illustrating the sensitivity of the network analyzer to signals received on the receive antenna.

However, if the receive antenna 100b is currently "in use", there are additional signals corresponding to up-link signals from mobile stations to the base station receiver 120b that are present on the feeder cable 110b and coupled to the network analyzer 140. To ensure that the up-link signals are properly received by the base station receiver 120b, the coupling factor of the second coupler 130b must be sufficiently low to prevent attenuation of the up-link signals below the sensitivity level of the base station receiver 120b. However, by reducing the coupling factor of the second coupler 130b, the overall network analyzer 140 sensitivity level is also reduced. Thus, as shown in FIG. 3, if the coupling factor reduces the overall sensitivity level 300 of the network analyzer below the power of some of the up-link signals (mobile transmissions), there may be some mobile transmissions that are not able to be detected by the network analyzer 140, and thus the network analyzer 140 may interfere with the mobile transmissions.

To increase the sensitivity of the network analyzer 140, the injected swept signal power can be increased. However, if the injected signal is at the same frequency as one of the up-link signals, the large injected signal can prevent the base station receiver 120b from detecting the up-link signal, thereby effectively jamming the up-link transmission. Once the base station receiver 120b no longer receives the up-link signal, the base station receiver 120b may drop the call.

Figure 4:
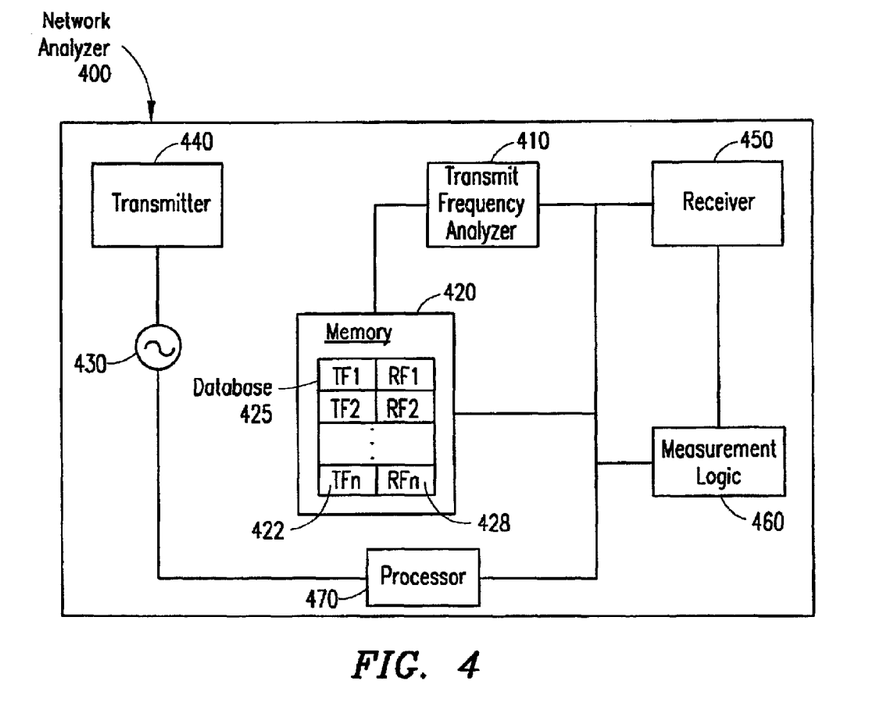
FIG. 4 is a block diagram of a network analyzer in accordance with embodiments of the present invention.

Therefore, as shown in FIG. 4, a network analyzer 400 in accordance with embodiments of the present invention can selectively inject a signal onto the receive antenna using transmit antenna information. The network analyzer 400 includes a transmit frequency analyzer 410 that determines one or more transmit frequencies currently utilized by the base station transmitter. As an example, the transmit frequency analyzer 410 can include a receiver for receiving one or more base station transmitted signals and frequency analysis logic for determining the particular transmit frequencies associated with the one or more received signals. It should be noted that as used herein, the term logic includes any combination of hardware, software and/or firmware necessary for performing the desired function implemented using any type of programming technique, including, but not limited to, object-oriented programming and custom-developed applications. As discussed above, since the base station transmit power levels are large (as compared to the receive levels), the network analyzer 400 can easily determine the transmit frequencies without any significant degradation to the transmitted signals.

In addition, the network analyzer 400 includes a memory 420 for storing information associating transmit frequencies and receive frequencies. For example, the memory 420 can include a database 425 containing a list of transmit frequencies 422 and associated receive frequencies 428. In other embodiments, the memory 420 can include one or more formulas (e.g., Receive Frequency=Transmit Frequency−45 MHz) that can be used to determine the operating receive frequencies. The memory 420 can be any type of memory device, such as, for example, RAM, ROM, EPROM, EEPROM, HDD or FDD implemented on any computer-readable medium, e.g., a ZIP® drive, floppy disk, hard drive, CD-ROM, non-volatile memory device, tape or any other type of data storage device. Each type of cellular communications format (e.g., frequency division multiple access, time division multiple access, code-division multiple access, etc.) has a known correlation between transmit frequencies 422 and associated receive frequencies 428. Therefore, when a base station transmitter transmits on a particular transmit frequency 422 towards a particular mobile station, the base station receiver recognizes transmissions from the particular mobile station by observing any received transmissions on a particular receive frequency 428 that is associated with the transmit frequency 422.

The network analyzer 400 further includes an unmodulated (continuous-wave) source 430 for generating a source signal, a transmitter 440 for transmitting the generated source signal, a receiver 450 for receiving the source signal and any reflected signal(s) and measurement logic 460 that performs the antenna return loss measurement. For example, the measurement logic 460 can perform the antenna return loss measurement by measuring the magnitude and phase of the reflected signal corresponding to the same frequency as the generated signal. The measurement logic 460 can also receive the transmitted frequencies and a reflected signal from the transmitted frequencies to measure the antenna return loss for the transmitted frequencies. Therefore, in some embodiments, at least part of the transmit frequency analyzer 410 is implemented with the measurement logic 460. In some embodiments, the source 430 includes, for example, a fractional-N synthesizer to provide high frequency resolution to enable only specific frequencies to be included in the source signal. A processor 470 (e.g., a microprocessor or microcontroller) coordinates the transmit frequency analyzer 410, source 430, receiver 450 and measurement logic 460 and accesses the memory 420 to determine appropriate receive frequencies for use by the source 430.

It should be understood that the receiver 450 can be the same receiver used by the transmit frequency analyzer 410 or a separate receiver. As an example, if the receiver 450 is the same for both the transmit frequency analyzer 410 and the receive frequency analysis, and the network analyzer 400 is connected to both the transmit antenna and receive antenna simultaneously, a switch (not shown) can be used to switch between receiving the transmit frequency and receiving the receive frequency. It should further be understood that, although not required, an analysis of both the transmit and receive frequencies can be performed by the same frequency determination functionality (e.g., the transmit frequency analyzer 410 can be used for both the transmit and receive frequencies or the transmit frequency analyzer 410 functionality can be included within the measurement logic 460).

Figure 5:
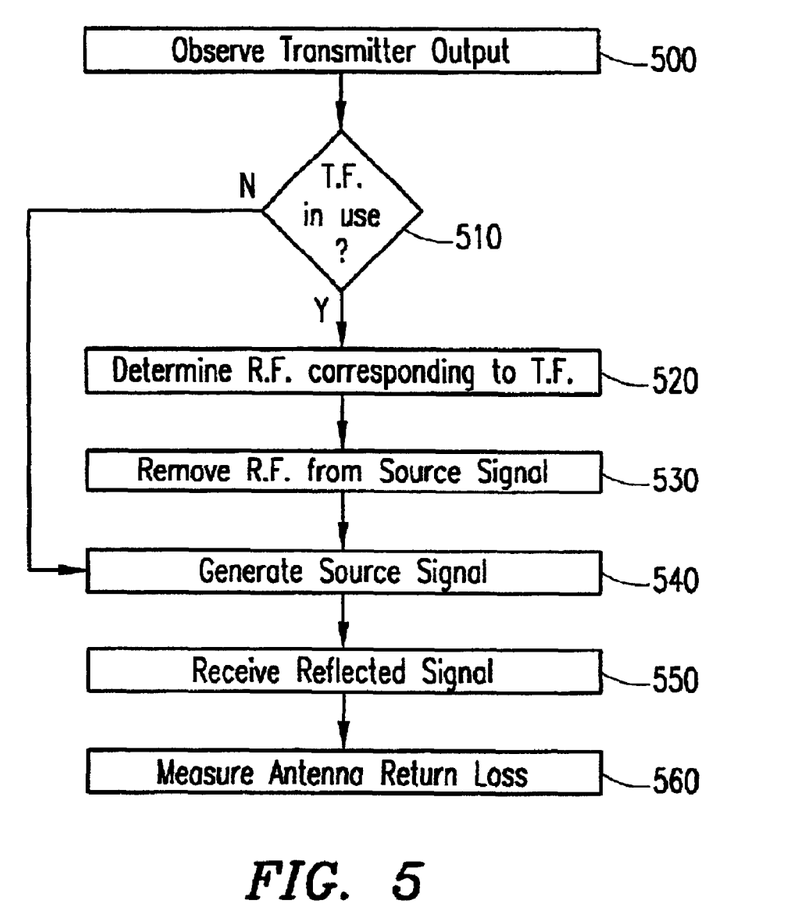
FIG. 5 is a flowchart illustrating the steps for measuring the antenna return loss using the network analyzer shown in FIG. 4.

FIG. 5 is a flowchart illustrating the steps for measuring the antenna return loss using the network analyzer shown in FIG. 4. Initially, the network analyzer observes the base station transmitter output at one or more transmit frequencies (step 500) to determine whether the one or more transmit frequencies are currently in use (step 510). If there are one or more transmit frequencies currently in use (step 510), the network analyzer determines the receive frequencies associated with the one or more transmit frequencies in use (step 520) and injects a source signal into the receive antenna (step 540) that avoids the receive frequencies in use (step 530). The source signal can include only one receive frequency, such that each receive frequency to be measured is generated sequentially, or multiple receive frequencies, such that more than one of the receive frequencies to be measured is generated simultaneously. However, if there are no transmit frequencies currently in use (step 510), the network analyzer can alternatively inject a swept signal into the receive antenna (step 540). Thereafter, the network analyzer receives the source signal and any reflected signal corresponding to the source signal (step 550) and measures the antenna return loss on the antenna using the reflected signal and the source signal (step 560).

Figure 6:
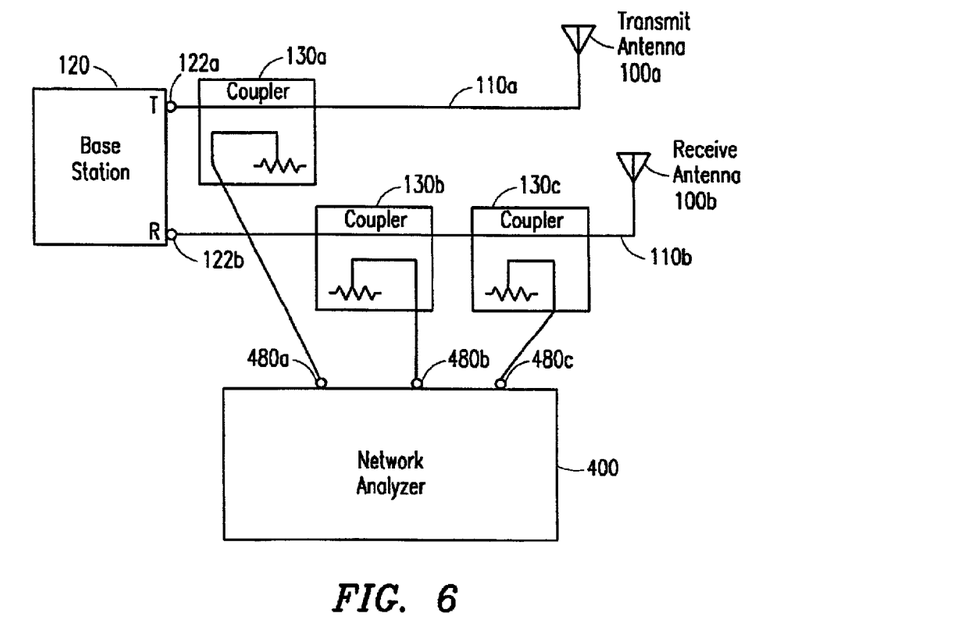
FIG. 6 illustrates one implementation of the network analyzer of the present invention.

FIG. 6 illustrates one implementation of the network analyzer 400 of the present invention. In FIG. 6, the base station 120 is shown having two separate feeder cables 110a and 110b provided towards two separate antennas 100a and 100b. One antenna is a transmit antenna 100a and the other antenna is a receive antenna 100b. The transmit antenna 100a is connected to the base station transmitter (illustrated by connection to the base station 120 at base station port 122a) over a transmit feeder cable 110a, while the receive antenna 100b is connected to the base station receiver (illustrated by connection to the base station 120 at base station port 122b) over a receive feeder cable 110b. The transmit and receive feeder cables 110a and 110b, respectively, can be implemented using any type of linking device, including, e.g., coaxial cables, waveguides, fiber optic links, etc. The network analyzer 400 is shown capable of being connected to both the transmit feeder cable 110a and receive feeder cable 110b simultaneously. However, it should be understood that in other embodiments, the network analyzer 400 can be connected to the transmit feeder cable 110a and receive feeder cable 110b sequentially. In addition, the transmit feeder cable 110a and receive feeder cable 110b can be connected to a single antenna (not shown) having both transmit and receive capabilities.

The network analyzer 400 is shown having three ports 480a–c, a first port 480a for receiving the transmit frequencies from the transmit feeder cable 110a, a second port 480b for injecting the source signal into the receive feeder cable 110b and a third port 480c for receiving the reflected signal from the receive feeder cable 110b. However, it should be understood that in other embodiments, the network analyzer 400 can have only two ports, one for receiving both the transmit frequencies and the reflected signal sequentially and one for injecting the source signal. In addition, the network analyzer 400 can have up to four ports, where the additional port injects a source signal into the transmit feeder cable 110a to measure the antenna return loss on the transmit antenna 100a for frequencies that are not currently in use. Alternatively, the network analyzer 400 can inject a source signal into the transmit feeder cable 110a using the same port 480b as for injecting a source signal into the receive feeder cable 110b.

The network analyzer 400 receives the transmit frequencies via a first coupler 130a connected to the transmit feeder cable 110a. Likewise, the network analyzer 400 injects the source signal onto the receive feeder cable 110b via a second coupler 130b connected to the receive feeder cable 110b and receives reflected signals from the receive feeder cable 110b via a third coupler 130c connected to the receive feeder cable 110b. The second and third couplers 130b and 130c, respectively, are set to a sufficiently low coupling factor (e.g., around −20 dB or less) to avoid undue attenuation of up-link signals present on the receive feeder cable 110b. However, since the network analyzer 400 has already determined that no receive frequencies are present on the source signal, the power level of the source signal can be high to compensate for the low coupling factor of the second and third couplers 130b and 130c, respectively. It should be understood that greater or fewer couplers may be required, depending upon the environment within which the network analyzer 400 is being used.

Figure 7:
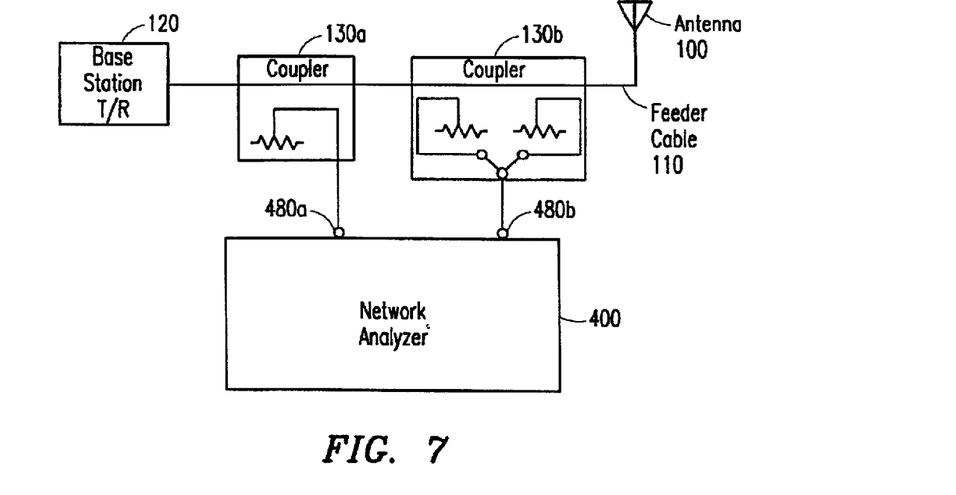
FIG. 7 illustrates another implementation of the network analyzer of the present invention.

FIG. 7 illustrates another implementation of the network analyzer 400 of the present invention. In FIG. 7, the antenna 100 is both a transmit antenna and a receive antenna. The antenna 100 is connected to the base station 120 (transmitter/receiver) via a single feeder cable 110. The network analyzer 400 is shown connected to the feeder cable 110 via two couplers 130a and 130b. One coupler 130a is connected to a source port 480a in the network analyzer 400 for injecting the source signal (transmit and/or receive source signals) onto the feeder cable 110, while the other coupler 130b is connected to a receive port 480b in the network analyzer 400 for receiving the transmit frequencies, source signal and reflected frequencies. Coupler 130b can include a switching device for switching between the transmit/source frequencies and reflected frequencies.

Figure 8:
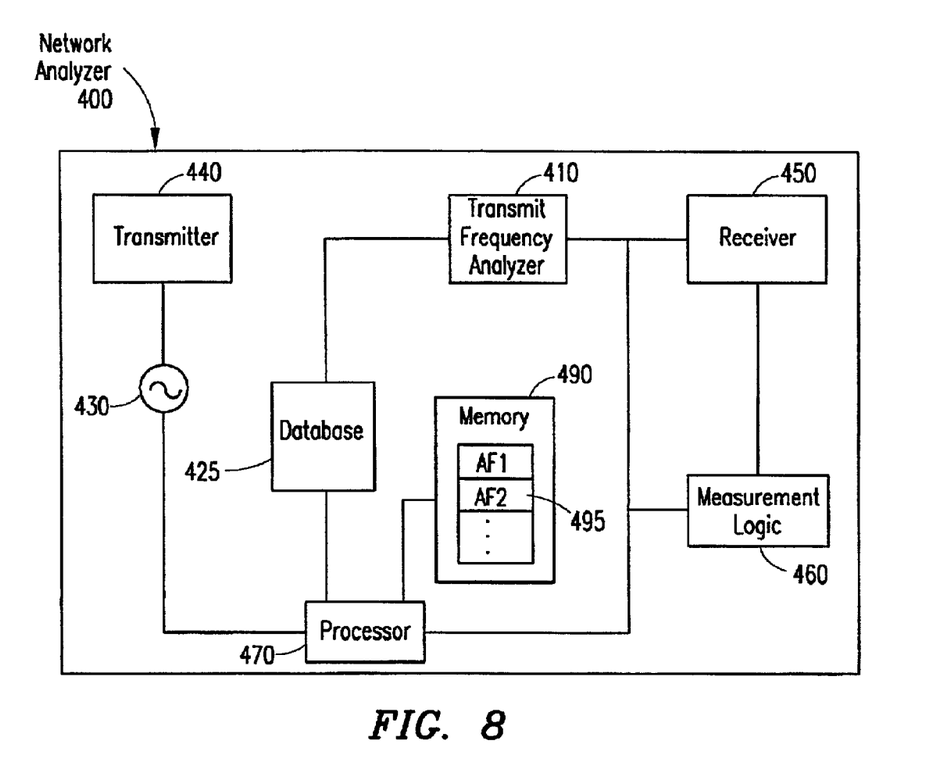
FIG. 8 is a block diagram illustrating additional functionality of the network analyzer of the present invention.

FIG. 8 is a block diagram illustrating additional functionality of the network analyzer 400 of the present invention. The network analyzer 400 is shown having an additional memory 490 (which, as discussed above, can be any type of memory implemented within any type of data storage device, including the same data storage device as the original memory) for storing avoided receive frequencies 495. The processor 470 accesses the additional memory 490 to store the avoided frequencies 495 (i.e., the receive frequencies that had an associated transmit frequency currently in use during the initial test run) and later retrieve the avoided frequencies 495. The processor 470 further accesses the database 425 to determine the transmit frequencies (422, shown in FIG. 4) associated with the avoided receive frequencies 495 and coordinates the transmit frequency analyzer 410, source 430, receiver 450 and measurement logic 460 to measure the antenna return loss on the previously avoided frequencies 495.

Figure 9:
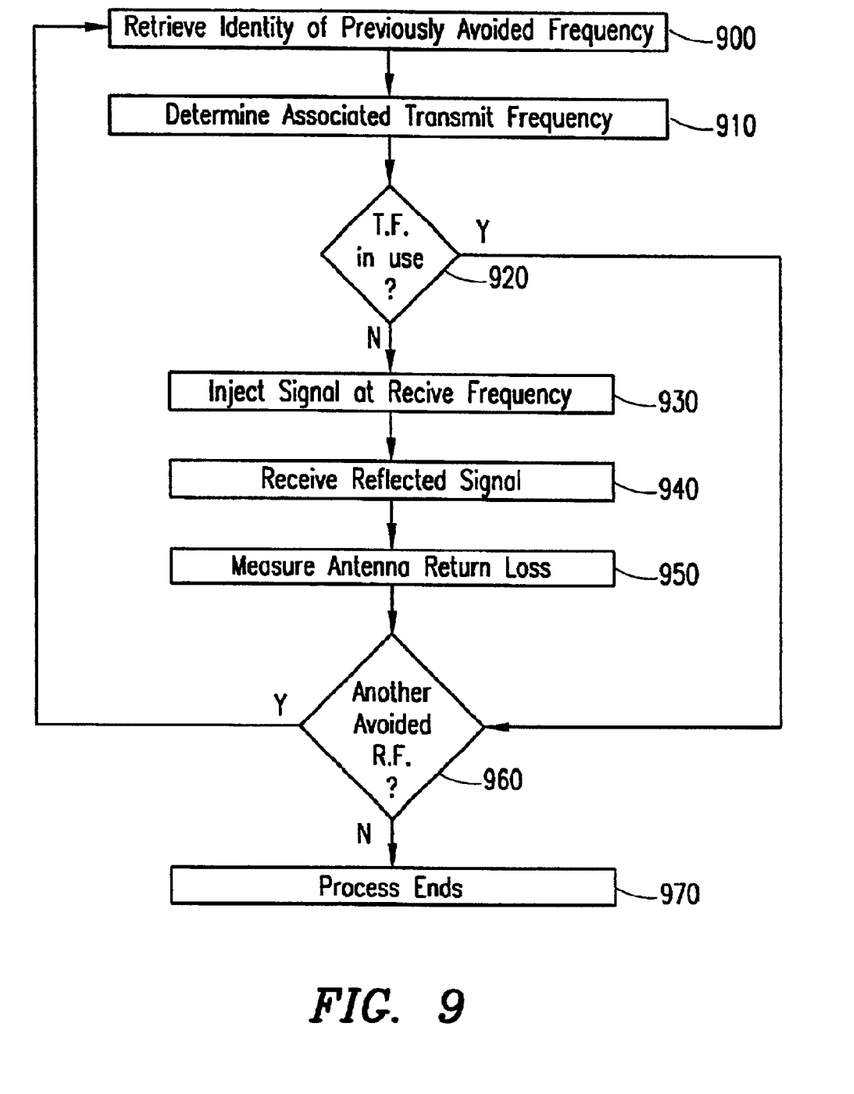
FIG. 9 is a flow chart illustrating the steps for filling in the receive antenna sweep with previously avoided receive frequencies in accordance with one embodiment of the present invention.

FIG. 9 is a flow chart illustrating the steps for filling in the receive antenna sweep with previously avoided receive frequencies in accordance with one embodiment of the present invention. During an initial test run on a "live" receive antenna, the network analyzer may avoid one or more receive frequencies that are currently in use. At a later time, a technician may desire to fill in the receive antenna sweep with the avoided frequencies. To accomplish this, the network analyzer can retrieve the identity of a previously avoided frequency (step 900), and determine the associated transmit frequency (step 910). Thereafter, the network analyzer observes the output of the base station transmitter at the associated transmit frequency to determine whether the transmit frequency is currently in use (step 920). If so, the network analyzer determines whether there are any additional previously avoided frequencies (step 960), and if so, retrieves the identity of another previously avoided frequency (step 900). Otherwise, the network analyzer ends processing (step 970).

If the base station transmitter is not currently operating at the associated transmit frequency (step 920), the network analyzer injects a source signal into the receive antenna at the previously avoided receive frequency (step 930), and receives the source signal and any reflected signal corresponding to the source signal (step 940). Thereafter, the network analyzer measures the antenna return loss on the antenna using the reflected signal and the source signal (step 950). If there any additional previously avoided frequencies (step 960), the network analyzer repeats the process (step 900). Otherwise, the network analyzer ends processing (step 970).

In another embodiment, instead of measuring the avoided frequencies at a later time, the antenna return loss for the avoided frequencies can be interpolated from surrounding measured frequencies. For example, the antenna return loss for the avoided frequencies can be calculated by the measurement logic as the average of the two nearest measured receive frequencies or by linear interpolation of surrounding measured receive frequencies. In a further embodiment, the antenna return loss for an avoided receive frequency can be determined by replicating the result from one nearby measured receive frequency.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

I claim:

1. A network analyzer, comprising:
   a memory accessible to said network analyzer storing information associating transmit frequencies and receive frequencies;
   receiver means receiving at least one operating one of said transmit frequencies;
   a source generating a source signal including one or more of said receive frequencies; and
   a processor operatively connected to said memory, said receiver means and said source, said processor receiving said at least one operating transmit frequency, accessing said memory to determine at least one operating one of said receive frequencies associated with said at least one operating transmit frequency and instructing said source to avoid inclusion of said at least one operating receive frequency within said source signal.

2. The network analyzer of claim 1, wherein said source further generates an additional source signal including said at least one operating receive frequency.

3. The network analyzer of claim 2, further comprising:
   an additional memory storing at least one avoided frequency corresponding to said at least one operating receive frequency.

4. The network analyzer of claim 3, further comprising:
   means for determining said at least one transmit frequency associated with said at least one avoided frequency; and
   means for determining that said at least one transmit frequency associated with said at least one avoided frequency is no longer in use.

5. The network analyzer of claim 4, wherein both said means for determining comprises at least said processor.

6. The network analyzer of claim 1, wherein said receiver means further receives said source signal and at least one reflected signal resulting from transmission of said source signal.

7. The network analyzer of claim 6, further comprising:
   measurement logic operatively connected to said processor and said receiver means, said measurement logic measuring data based on said source signal and said reflected signal.

8. The network analyzer of claim 7, wherein said source generates an additional source signal including said transmit frequencies other than said at least one operating transmit frequency, and said receiver means receives said additional source signal and an additional reflected signal resulting from transmission of said additional source signal, said measurement logic measuring said data based on said at least one operating transmit frequency, said additional source signal and said additional reflected signal.

9. The network analyzer of claim 6, further comprising:

a transmitter connected to said source, said transmitter transmitting said source signal.

10. A method for measuring data associated with an antenna of a base station within a cellular network, comprising:

providing information associating transmit frequencies and receive frequencies, said information being accessible to a network analyzer;

receiving at least one operating one of said transmit frequencies at said network analyzer;

determining at least one operating one of said receive frequencies associated with said at least one operating transmit frequency; and generating a source signal including one or more of said receive frequencies for injection into the antenna from said network analyzer, said source signal avoiding inclusion of said at least one operating receive frequency.

11. The method of claim 10, further comprising:

generating an additional source signal including said at least one operating receive frequency for injection into the antenna from said network analyzer.

12. The method of claim 11, further comprising:

storing at least one avoided frequency corresponding to said at least one operating receive frequency in an additional memory accessible to said network analyzer.

13. The method of claim 12, further comprising:

determining said at least one transmit frequency associated with said at least one avoided frequency; and determining that said at least one transmit frequency associated with said at least one avoided frequency is no longer in use.

14. The method of claim 10, further comprising:

receiving said source signal and at least one reflected signal resulting from transmission of said source signal at said network analyzer.

15. The method of claim 14, further comprising:

measuring the data associated with the antenna based on said source signal and said reflected signal.

16. The method of claim 15, further comprising:

generating an additional source signal including said transmit frequencies other than said at least one operating transmit frequency.

17. The method of claim 16, further comprising:

receiving said additional source signal and an additional reflected signal resulting from transmission of said additional source signal at said network analyzer.

18. The method of claim 17, wherein said step of measuring further comprises:

measuring the data associated with the antenna based on said at least one operating transmit frequency, said additional source signal and said additional reflected signal.

19. The method of claim 15, further comprising:

transmitting said source signal from said network analyzer towards the antenna.

* * * * *